United States Patent
Nagai et al.

(10) Patent No.: US 8,141,343 B2
(45) Date of Patent: Mar. 27, 2012

(54) AIR-FUEL RATIO CONTROL APPARATUS

(75) Inventors: Hiroyuki Nagai, Yokohama (JP);
Yoshiyuki Ootake, Yokohama (JP);
Yasuji Ishizuka, Chigasaki (JP); Masaki Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1100 days.

(21) Appl. No.: 11/961,049

(22) Filed: Dec. 20, 2007

(65) Prior Publication Data

US 2008/0172166 A1 Jul. 17, 2008

(30) Foreign Application Priority Data

Jan. 12, 2007 (JP) .................................. 2007-004545

(51) Int. Cl.
*F01N 3/00* (2006.01)

(52) U.S. Cl. ............ 60/285; 60/274; 60/287; 60/288

(58) Field of Classification Search .............. 60/274, 60/276, 285, 287, 288, 299
See application file for complete search history.

(56) References Cited

U.S. PATENT DOCUMENTS

| | | | |
|---|---|---|---|
| 5,022,225 A | | 6/1991 | Sawada et al. |
| 5,085,050 A | * | 2/1992 | Katoh ............................ 60/288 |
| 5,398,503 A | * | 3/1995 | Danno et al. ................... 60/288 |
| 5,577,383 A | * | 11/1996 | Kuroda et al. .................. 60/284 |
| 6,018,943 A | * | 2/2000 | Martin et al. ................... 60/274 |
| 2006/0236682 A1 | | 10/2006 | I et al. |

FOREIGN PATENT DOCUMENTS

| | | |
|---|---|---|
| CN | 1854475 A | 11/2006 |
| EP | 1715152 A1 | 7/2002 |
| EP | 2022968 A1 | 2/2009 |
| GB | 2294556 A | 5/1996 |
| JP | H05-321644 A | 12/1993 |
| JP | H08-261042 A | 10/1996 |
| JP | 09-014024 * | 1/1997 |
| JP | H09-014024 A | 1/1997 |
| JP | 2006-214300 A | 8/2006 |
| JP | 2006-299936 A | 11/2006 |

OTHER PUBLICATIONS

An English translation of the Chinese Office Action of corresponding Chinese Application No. 200810002635X, dated Oct. 16, 2009.
An English translation of the Japanese Office Action of corresponding Japanese Application No. JP 2007-004545, dated Mar. 15, 2011, mailed Mar. 22, 2011.
The extended European search report for corresponding European Patent Application No. 08150079.5, dated Aug. 1, 2011.

* cited by examiner

*Primary Examiner* — Thomas Denion
*Assistant Examiner* — Diem Tran
(74) *Attorney, Agent, or Firm* — Global IP Counselors, LLP

(57) ABSTRACT

An air-fuel ratio control apparatus is basically provided with an exhaust system, a pair of sensors and a controller. The exhaust system includes an exhaust channel having a main catalytic converter, a bypass channel having a bypass catalytic converter, and a valve mechanism disposed in the exhaust channel to switch a pathway for exhaust gas from the exhaust channel to the bypass channel. The sensors output signals indicative of air-fuel ratios of exhaust flowing in their respective channels. The controller has first and second air-fuel ratio control sections that control an engine air-fuel ratio based on outputs of the sensors, respectively. The controller has a control mode switching section that switches control from the first air-fuel ratio control section to the second air-fuel ratio control section after a prescribed interval of time has elapsed from when the valve mechanism is switched from a closed state to an open state.

16 Claims, 5 Drawing Sheets

AIR-FUEL RATIO CONTROL APPARATUS

CROSS-REFERENCE TO RELATED APPLICATIONS

This application claims priority to Japanese Patent Application No. 2007-004545, filed on Jan. 12, 2007. The entire disclosure of Japanese Patent Application No. 2007-004545 is hereby incorporated herein by reference.

BACKGROUND OF THE INVENTION

1. Field of the Invention

The present invention generally relates to an air-fuel ratio control apparatus for controlling the air-fuel ratio of an engine. More specifically, the present invention relates to an air-fuel ratio control apparatus that controls the air-fuel ratio without increasing emissions.

2. Background Information

Most vehicles are provided with an exhaust cleaning system that includes an underfloor catalytic converter. When the underfloor catalytic converter is disposed in the exhaust pathway under the floor or in a position set at a distance from the engine for cleaning exhaust that flows from the engine of a vehicle, time is required until activation occurs so as to obtain sufficient cleaning action. On the other hand, positioning the underfloor catalytic converter in the exhaust pathway in a position near the engine poses a problem in that durability is reduced due to thermal degradation.

Some vehicles are provided with an exhaust cleaning system that includes a main (underfloor) catalytic converter and a bypass catalytic converter. One example of this type of exhaust cleaning system is disclosed in Japanese Laid-Open Patent Application No. 5-321644. In this publication, the underfloor catalytic converter is disposed on the downstream side of a main channel of the exhaust channel, and the bypass catalytic converter is disposed in a bypass channel on the upstream side of the underfloor catalytic converter. A switching valve for switching the exhaust flow between the main channel and the bypass channel is disposed in the main channel on the upstream side from the underfloor catalytic converter. The exhaust thereby flows to the bypass channel until the underfloor catalytic converter is activated, and the exhaust is cleaned by the bypass catalytic converter that is activated early, whereby the exhaust cleaning efficiency of a vehicle can be improved.

In view of the above, it will be apparent to those skilled in the art from this disclosure that there exists a need for an improved air-fuel ratio control apparatus. This invention addresses this need in the art as well as other needs, which will become apparent to those skilled in the art from this disclosure.

SUMMARY OF THE INVENTION

It has been discovered that in the air-fuel ratio control apparatus described in Japanese Laid-Open Patent Application No. 5-321644, the exhaust (hereinafter referred to as "residual gas") remaining in the main channel upstream of the switching valve flows downstream when the switching valve is opened so as to allow the exhaust to flow through the main channel. The residual gas is at a lower temperature than the exhaust discharged from the engine. Therefore, the residual gas cools the air-fuel ratio sensor disposed downstream from the switching valve. As a result, there is a problem in that the detection accuracy of the air-fuel ratio sensor is reduced. Also the air-fuel ratio cannot be accurately controlled when the air-fuel ratio of the engine is controlled based on the detection value of the sensor, such that emissions become worse.

In view of the above, one object of the present invention is to provide an air-fuel ratio control apparatus that can control the air-fuel ratio without allowing emissions from becoming worse even when the switching valve has opened.

The above mentioned object can basically be attained by providing an air-fuel ratio control apparatus is basically comprises an exhaust system, a first sensor, a second sensor and a controller. The exhaust system includes an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to selectively open and close the exhaust channel to switch a pathway for exhaust gas from the exhaust channel to the bypass channel. The first sensor is arranged to detect a property indicative of an air-fuel ratio of exhaust flowing in the bypass channel. The second sensor is arranged to detect a property indicative of an air-fuel ratio of exhaust flowing in the exhaust channel at a point downstream of the valve mechanism. The controller includes a first air-fuel ratio control section configured to control an engine air-fuel ratio based on an output of the first sensor, a second air-fuel ratio control section configured to control the engine air-fuel ratio based on an output of the second sensor, and a control mode switching section configured to switch from control by the first air-fuel ratio control section to control by the second air-fuel ratio control section after a prescribed interval of time has elapsed from when the valve mechanism is switched from a closed state to an open state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
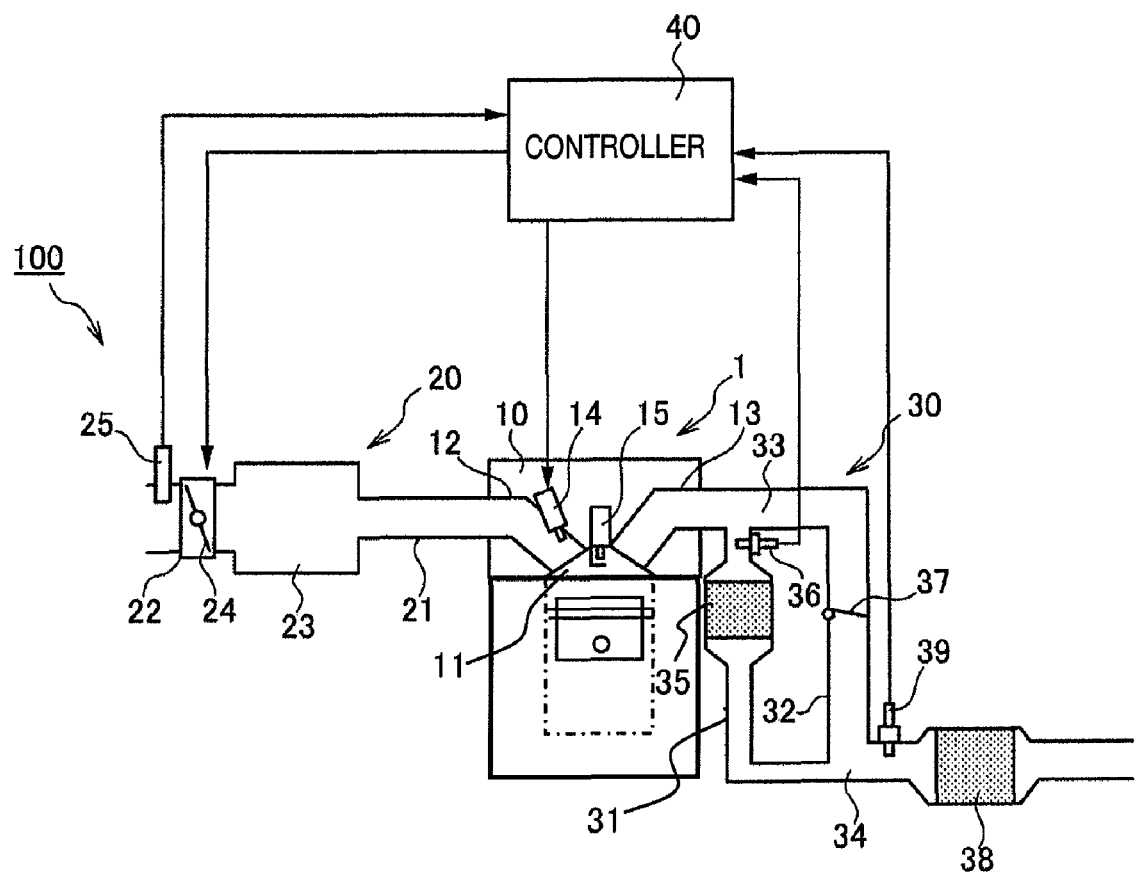
FIG. 1 is a simplified diagram of an air-fuel ratio control apparatus for controlling the air-fuel ratio of an engine in accordance with a first embodiment.

Referring initially to FIG. 1, an air-fuel ratio control apparatus 100 is a simplified diagram illustrating an air-fuel ratio control apparatus 100 in accordance with a first embodiment of the present invention. The air-fuel ratio control apparatus 100 basically includes an engine 1, an intake system 20, an exhaust system 30 and a controller 40. The air-fuel ratio control apparatus 100 controls the air-fuel ratio of the engine 1.

The engine 1 is a conventional internal combustion engine that is well known in the art. Since internal combustion engines are well known in the art, the structures of the engine 1 will not be discussed or illustrated in detail herein. Rather, only the control of the air-fuel ratio of the engine 1 is different. Thus, only those components of the engine 1 that are needed to understand the present invention will be discussed.

The engine 1 includes a cylinder head 10 with a plurality of combustion chambers 11 (only one shown), an intake port 12 for each cylinder and an exhaust port 13 for each cylinder. The intake port 12 is configured and arranged to taken in outside (intake) air and convey the intake air to a respective one of the combustion chambers 11. The exhaust port 13 is configured and arranged to convey exhaust from a respective one of the combustion chambers 11 of the engine 1.

Fuel is combusted in the combustion chambers 11 with the aid of a plurality of piston (only one depicted) slidably arranged in a cylinder block. A fuel injection valve 14 is disposed in the cylinder head 10 so as to protrude into the intake port 12 for each cylinder. The fuel injection valve 14 injects fuel into the intake port 12 in accordance with the vehicle operating state of the vehicle. An air-fuel mixture is formed by the fuel injected into the intake port 12 and the intake air taken in from the outside into the intake port 12.

A spark plug 15 is disposed in the cylinder head 10 on the top surface side of the combustion chamber 11 for each cylinder so as to protrude into the combustion chamber 11 for each cylinder. The spark plug 15 ignites the air-fuel mixture inside the combustion chamber 11 by discharging a spark with prescribed timing, and causing the air-fuel mixture to combust.

The intake system 20 includes an intake channel 21 of the intake system 20 that takes in fresh air from the outside. The intake channel 21 is fluidly connected to the intake port 12 formed in the cylinder head 10. The intake channel 21 is provided with a throttle chamber 22 and a collector tank 23 at a midway point.

The throttle chamber 22 is disposed on the upstream side of the intake channel 21. A throttle valve 24 is disposed in the throttle chamber 22 in order to control the intake rate of the intake air through the intake channel 21. The throttle valve 24 controls the intake rate by adjusting the position of the throttle in accordance with the vehicle operating state of the vehicle.

An airflow meter 25 is disposed in the intake channel 21 on an upper side of the throttle chamber 22. The airflow meter 25 detects the intake rate of fresh (intake) air taken in from the outside. A collector tank 23 is disposed in the intake channel 21 on the downstream side of the throttle valve 24. The collector tank 23 temporarily accumulates air that has flowed from upstream.

The exhaust system 30 includes a bypass channel 31 and a main exhaust channel 32. The main exhaust channel 32 of the exhaust system 30 is connected to the exhaust port 13 formed in the cylinder head 10. The main exhaust channel 32 conducts the exhaust gas discharged from the engine 1.

The bypass channel 31 is a channel having a smaller diameter than the main exhaust channel 32. The bypass channel 31 has an upstream end that branches from the main exhaust channel 32 at a branching section 33 and a downstream end that remerges with the main exhaust channel 32 at a merging section 34 downstream from the branching section. The bypass channel 31 is provided with a bypass catalytic converter 35 and an air-fuel ratio sensor 36 (hereinafter referred to as "first air-fuel ratio sensor"). The bypass catalytic converter 35 is disposed on an upstream side of the bypass channel 31 in proximity to the engine 1 so as to achieve early activation. The bypass catalytic converter 35 is a catalytic converter or the like having excellent low-temperature activity.

The main exhaust channel 32 includes a switching valve 37, a main catalytic converter 38, and an air-fuel ratio sensor 39 (hereinafter referred to as "second air-fuel ratio sensor"). The bypass catalytic converter 35 is a catalytic converter that has a smaller capacity than the main catalytic converter 38 (hereinafter referred to as "underfloor catalytic converter"). The underfloor catalytic converter 38 is disposed downstream from the merging section 34.

The first air-fuel ratio sensor 36 is disposed in the bypass channel 31 further upstream than the bypass catalytic converter 35. The first air-fuel ratio sensor 36 detects the oxygen concentration in the exhaust flowing into the bypass channel 31, and can obtain output proportional to the oxygen concentration.

On the other hand, the main exhaust channel 32 is a channel having a greater diameter than that of the bypass channel 31, and the channel resistance that obstructs the flow of exhaust is therefore less than that of the bypass channel 31. The switching valve 37 is disposed in the main exhaust channel 32 between the branching section 33 and the merging section 34. The switching valve 37 opens and closes the main exhaust channel 32 in accordance with the vehicle operating condition of the vehicle. Thus, the switching valve 37 switches the exhaust channel for conveying the exhaust being discharged from the engine 1.

The underfloor catalytic converter 38 is disposed in the main exhaust channel 32 downstream from the merging section 34. The underfloor catalytic converter 38 is a three-way catalytic converter having a larger capacity than does the bypass catalytic converter 35. The underfloor catalytic converter 38 cleans the exhaust that flows through the main exhaust channel 32.

The second air-fuel ratio sensor 39 is disposed in the main exhaust channel 32 on the upstream side of the underfloor catalytic converter 38. With the second air-fuel ratio sensor 39, the oxygen concentration in the exhaust flowing through the main exhaust channel 32 is detected in the same manner as with the first air-fuel ratio sensor 36 disposed in the bypass channel 31.

The controller 40 preferably includes a microcomputer with an air-fuel ratio control program that controls the injection valve 14, the throttle valve 24 and the switching valve 37 as discussed below. The microcomputer of the controller 40 preferably includes other conventional components such as an input/output interface circuit, and storage devices such as a ROM (Read Only Memory) device and a RAM (Random Access Memory) device. The microcomputer of the controller 40 is programmed to control the operations of the injection valve 14, the throttle valve 24 and the switching valve 37 as discussed below. The memory circuit stores processing results and control programs for carrying out the operations of the air-fuel ratio control apparatus 100. It will be apparent to those skilled in the art from this disclosure that the precise structure and algorithms for the controller 40 can be any combination of hardware and software that will carry out the functions of the present invention.

The outputs of the airflow meter 25, the first and second air-fuel ratio sensors 36 and 39, and other sensors that detect the operating state of the vehicle are inputted to the controller 40. The controller 40 opens and closes the switching valve 37 in accordance with the vehicle operating state of the vehicle in the manner described below. Thus, the controller 40 switches the channel that conveys the exhaust discharged from the engine 1 to either the bypass channel 31 or the main exhaust channel 32. The controller 40 adjusts the position of the throttle valve 24 and the fuel injection rate of the fuel injection valve 14 based on the output values of the first and second air-fuel ratio sensors 36 and 39, and controls the air-fuel ratio of the engine 1.

Figure 2A:
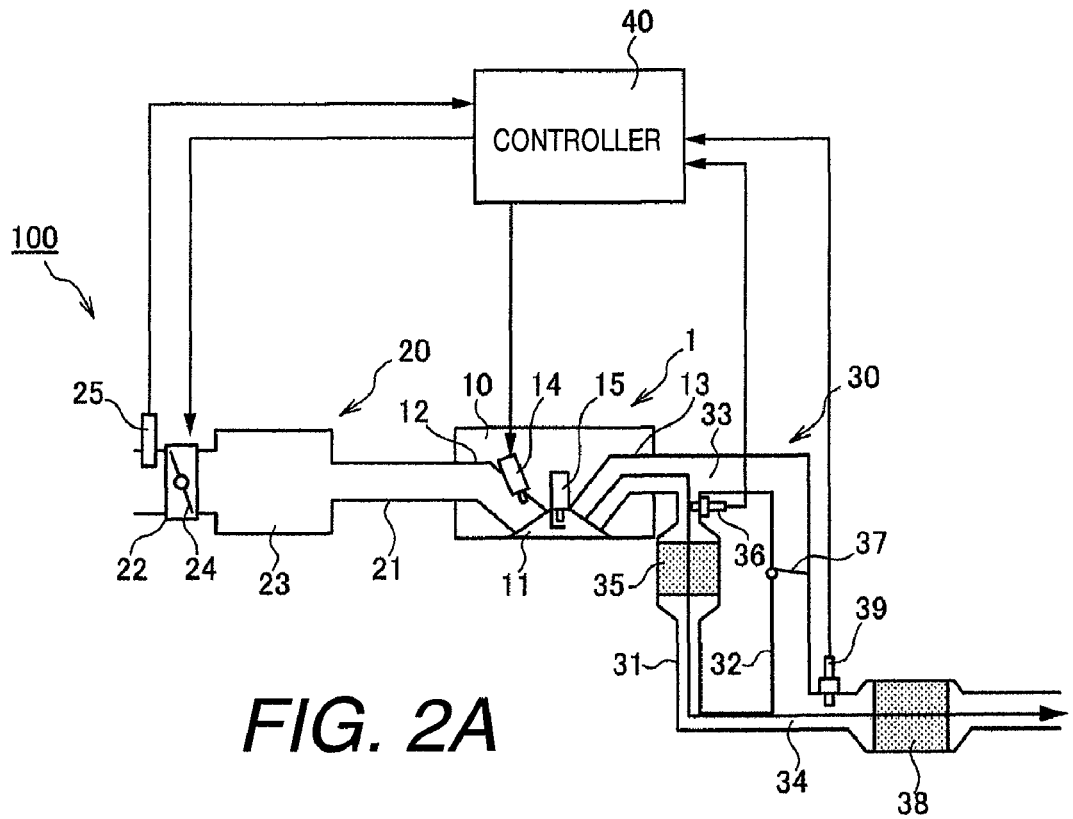
FIG. 2A is a simplified diagram of the air-fuel ratio control apparatus illustrated in FIG. 1, showing the flow of exhaust discharged from the combustion chamber of an engine when the switching valve is closed.
Figure 2B:
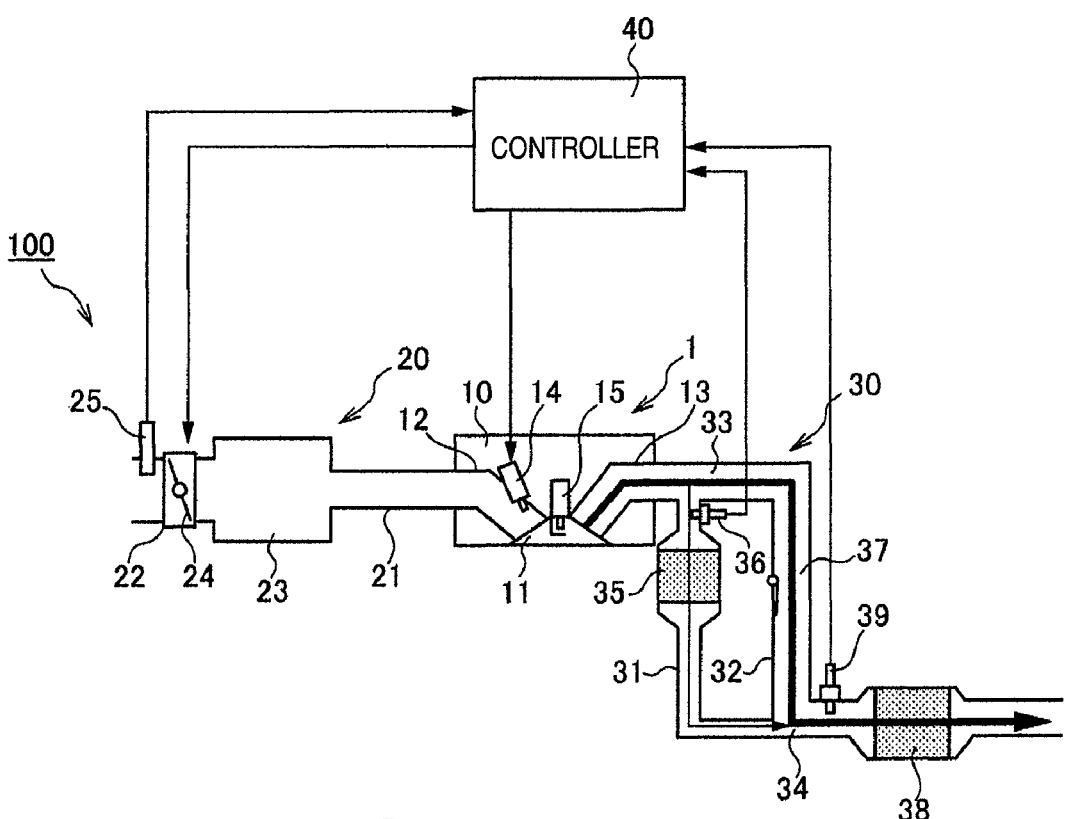
FIG. 2B is a simplified diagram of the air-fuel ratio control apparatus illustrated in FIGS. 1 and 2A, but showing the flow of exhaust discharged from the combustion chamber of an engine when the switching valve is closed.

FIGS. 2A and 2B are diagrams showing the flow of exhaust discharged from the engine 1. FIG. 2A shows the flow of exhaust when the switching valve 37 is in an open state. FIG. 2B shows the flow of exhaust when the switching valve 37 is in an open state. The flow of exhaust is indicated by arrows in the diagram, and the flow rate of the exhaust is indicated by the thickness of the line.

The switching valve 37 is closed and the main exhaust channel 32 is blocked off immediately after the engine 1 has been started up and at other times when the engine temperature and exhaust temperature are low, as shown in FIG. 2A. For this reason, all of the exhaust discharged from the engine 1 passes from the branching section 33 through the bypass channel 31 and is cleaned by the bypass catalytic converter 35. The bypass catalytic converter 35 is disposed in a position proximate to the engine 1, and is therefore rapidly activated and can clean the exhaust at an early stage. The exhaust cleaned by the bypass catalytic converter 35 flows to the downstream side of the bypass channel 31, flows from the merging section 34 into the main exhaust channel 32, and is released to the outside air after passing through the underfloor catalytic converter 38.

In this manner, during started up and times of low engine temperature and low exhaust temperature, the switching valve 37 is in a closed state such that the exhaust flows through the bypass channel 31. In this case, the first air-fuel ratio sensor 36 disposed in the bypass channel 31 detects the oxygen concentration of the exhaust that flows through the bypass channel 31. The controller 40 then adjusts the position of the throttle valve 24 and the fuel injection rate based on the detection value of the first air-fuel ratio sensor 36 and controls the air-fuel ratio in accordance with the engine operating state of the engine 1.

On the other hand, when the underfloor catalytic converter 38 is warmed and activated by exhaust from the engine 1 or when torque is demanded in response to the driver depressing the accelerator and the exhaust flow rate increases, then the switching valve 37 is opened in the manner shown in FIG. 2B. The controller 40 then adjusts the position of the throttle valve 24 and the fuel injection rate based on the detection value of the second air-fuel ratio sensor 39 and controls the air-fuel ratio in accordance with the engine operating state of the engine 1.

Most of the exhaust discharged from the engine 1 flows through the main exhaust channel 32 when the switching valve 37 is opened. A portion of the exhaust flows into the bypass channel 31 as well. However, since the bypass channel 31 has a smaller channel sectional area than the main exhaust channel 32, the exhaust flow rate through the bypass channel 31 is therefore less than that of the main exhaust channel 32. For this reason, thermal degradation of the bypass catalytic converter 35 that occurs when high-temperature exhaust passes through the bypass catalytic converter 35 is reduced. The exhaust that has flowed through the main exhaust channel 32 and the bypass channel 31 is cleaned by the underfloor catalytic converter 38 and is released to the outside air.

In this manner, the exhaust flow rate of the exhaust that flows through the main exhaust channel 32 is greater than that of the exhaust that flows through the bypass channel 31 when the switching valve 37 is open. The oxygen concentration in the exhaust can therefore be measured with good precision when the switching valve 37 is open by switching from the first air-fuel ratio sensor 36 disposed in the bypass channel 31 to the second air-fuel ratio sensor 39 disposed in the main exhaust channel 32. Adjustments can be made based on the detection value of the second air-fuel ratio sensor 39, so that the position of the throttle valve 24 and the fuel injection rate correspond to the engine operating state of the engine 1, and the air-fuel ratio is controlled in accordance with the engine operating state of the engine 1.

A portion of the exhaust from the engine 1 remains inside the main exhaust channel 32 in proximity to the switching valve 37 when the switching valve 37 is in a closed state. The remaining gas (residual gas) releases heat through the main exhaust channel 32 and the switching valve 37 during residence. Therefore, this remaining gas (residual gas) is at a lower temperature than the exhaust immediately after being discharged from the engine 1. When the residual gas is cooled by the switching valve 37 and other components, moisture in the residual gas condenses and is deposited on the switching valve 37 and other components. The moisture is flushed downstream when the switching valve 37 is opened. When the moisture is deposited on the second air-fuel ratio sensor 39, which has been warmed to the activation temperature, the second air-fuel ratio sensor 39 rapidly cools. There is a possible problem in that when the second air-fuel ratio sensor 39 is rapidly cooled in this manner, the sensor element of the second air-fuel ratio sensor 39 cracks and the oxygen concentration in the exhaust cannot be accurately detected. In view of this situation, the second air-fuel ratio sensor 39 is preferably disposed in a position in which the condensed moisture described above and other types of moisture are less liable to be deposited.

In this manner, the second air-fuel ratio sensor 39 is cooled when the switching valve 37 is opened from a closed state and the low-temperature residual gas flows toward the underfloor catalytic converter 38 that is downstream from the main exhaust channel 32 in a case in which the second air-fuel ratio sensor 39 is disposed in a position in which moisture is less likely to be deposited. There is a problem in that the detection accuracy of the second air-fuel ratio sensor 39 is compromised when the second air-fuel ratio sensor 39 is cooled to a temperature that is less than the activation temperature. Also when a switch is made in this state from the first air-fuel ratio sensor 36 to the second air-fuel ratio sensor 39 for controlling the air-fuel ratio of the engine 1, the air-fuel ratio of the engine 1 cannot be accurately controlled and emissions become worse.

Thus, it is desirable that the air-fuel ratio feedback control via the second air-fuel ratio sensor 39 be started with the aim of controlling the fuel injection rate with good precision at an earlier stage in order to improve exhaust performance at startup as well. However, when a switch is made from the first air-fuel ratio sensor 36 to the second air-fuel ratio sensor 39 at the same time that the switching valve 37 is switched, relatively cool air (compared to the engine exhaust) that was in the space between the branching section and the switching valve 37 when the switching valve 37 of the main exhaust channel 32 and the bypass channel 31 was switched from closed to open passes in the vicinity of the second (downstream-side) air-fuel ratio sensor 39, the output of the second air-fuel ratio sensor 39 on the downstream side is thereby affected. In particular, the temperature of the sensor element of the second air-fuel ratio sensor 39 is momentarily reduced to an inactive temperature. Thus, if the detection value of the second air-fuel ratio sensor 39 were outputted, the air-fuel ratio feedback control would be negatively affected, and the exhaust may deteriorate.

In view of this situation, in the illustrated embodiments, emissions are prevented from deteriorating due to residual gas by giving consideration to the reduced temperature of the second air-fuel ratio sensor 39 when the switching valve 37 opens the main exhaust channel 32, and by setting the control mode that determines whether the activation state is maintained, and then making a switch from the first air-fuel ratio sensor 36 to the second air-fuel ratio sensor 39.

Figure 3:
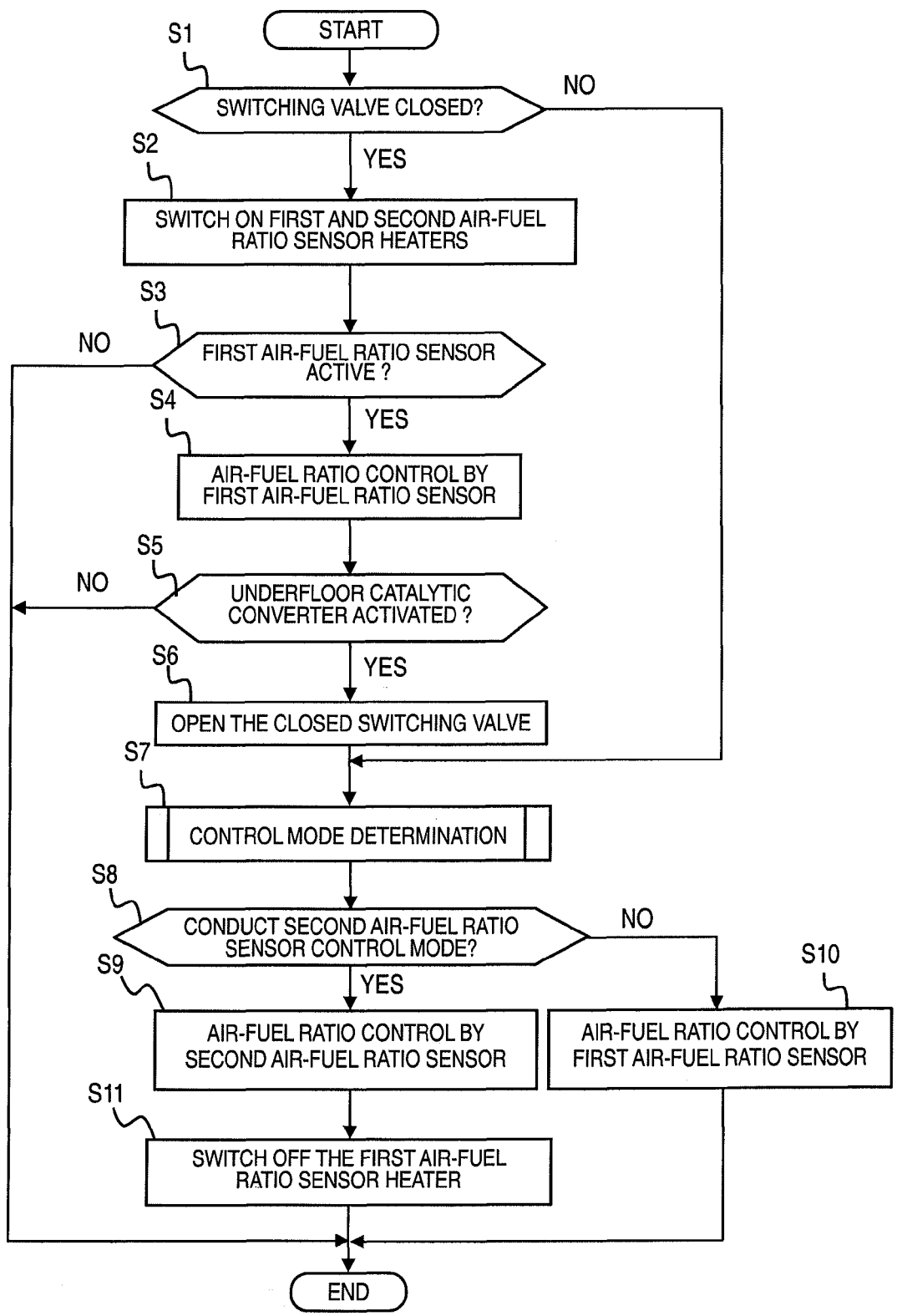
FIG. 3 is a flowchart showing the processing steps executed by the air-fuel ratio control apparatus in accordance with the first embodiment.

Here, the control details of the air-fuel ratio control apparatus 100 of the first embodiment carried out by the controller 40 will be described with reference to FIG. 3. FIG. 3 is a flowchart showing the control routine of the air-fuel ratio control apparatus 100 of the first embodiment. The control is carried out together with the startup of the engine 1 and is carried out at fixed cycles, e.g., 10 ms cycles, until the air-fuel ratio control performed by the second air-fuel ratio sensor 39 is started.

In step S1, the controller 40 determines whether the switching valve 37 has opened the main exhaust channel 32 or not. Here, the process advances to step S2 in the case that the switching valve 37 is in a closed state, and the process advances to step S7 in the case that the switching valve 37 is in an open state.

In step S2, the controller 40 energizes the heaters that warm the first air-fuel ratio sensor 36 and the second air-fuel ratio sensor 39. The heaters warm the first and second air-fuel ratio sensors 36 and 39 to the activation temperature, and the process advances to step S3.

In step S3, the controller 40 determines whether the first air-fuel ratio sensor 36 disposed in the bypass channel 31 is active. The activation determination is made based on the sensor element temperature of the first air-fuel ratio sensor 36. When it has been determined that the first air-fuel ratio sensor 36 has been active (i.e., the sensor element temperature of the first air-fuel ratio sensor 36 has reached a prescribed temperature), the process then advances to step S4. When it has been determined that the first air-fuel ratio sensor 36 has not been active (i.e., the sensor element temperature of the first air-fuel ratio sensor 36 is below the prescribed temperature), the heaters of the first and second air-fuel ratio sensors 36 and 39 are kept on and the current process is ended.

In step S4, the controller 40 controls the air-fuel ratio of the engine 1 based on the detection value of the first air-fuel ratio sensor 36. Specifically, the exhaust from the combustion chamber 11 flows through the bypass channel 31 when the switching valve 37 is closed. Therefore, in step S4, the first air-fuel ratio sensor 36 disposed in the bypass channel 31 detects the oxygen concentration of the exhaust that flows through the bypass channel 31, and brings oxygen concentration to the air-fuel ratio that corresponds to the engine operating state of the engine 1 based on the detection value. The step S4 constitutes a first air-fuel ratio control section.

In step S5, the controller 40 determines whether the underfloor catalytic converter 38 is activated based on catalyst temperature (i.e., if the catalyst temperature of the underfloor catalytic converter 38 reaches the prescribed temperature, then the underfloor catalytic converter 38 is activated). Thus, up to this point in the process, the exhaust that has flowed through the bypass channel 31 is cleaned by the bypass catalytic converter 35 and is admitted into the main exhaust channel 32 at the merging section 34. The exhaust that has flowed into the main channel via the bypass channel 31 then passes through the underfloor catalytic converter 38 disposed downstream of the main exhaust channel 32. The underfloor catalytic converter 38 is therefore gradually warmed to the catalyst activation temperature. When the underfloor catalytic converter 38 has reached the activation temperature, the process advances to step S6. If the activation temperature of the underfloor catalytic converter 38 has not been reached, then the current process cycle is ended.

In step S6, when the underfloor catalytic converter 38 is activated, the controller 40 opens the switching valve 37 from a closed state, and the channel through which the exhaust flows is switched. The switching valve 37 can be opened not only when the underfloor catalytic converter 38 is activated, but also when the driver depresses the accelerator to demand torque and to cause the exhaust rate to increase.

In step S7, the controller 40 determines whether the control mode is the first air-fuel ratio control mode for controlling the air-fuel ratio of the engine 1 with the aid of the first air-fuel ratio sensor 36 or in the second air-fuel ratio control mode for controlling the air-fuel ratio of the engine 1 with the aid of the second air-fuel ratio sensor 39. This determination can be made as seen in the flow chart of FIG. 4 or FIG. 5.

In step S8, the controller 40 determines whether the control mode is the second air-fuel ratio sensor control mode. Here, the process advances to step S10 when the control mode is the first air-fuel ratio sensor control mode. In step S10, the controller 40 feedback controls the air-fuel ratio of the engine 1 based on the detection value of the first air-fuel ratio sensor 36. On the other hand, the process advances to step S9 when the control mode is the second air-fuel ratio sensor control mode.

In step S9, the controller 40 makes adjustments to the position of the throttle valve and the fuel injection rate based on the detection value of the second air-fuel ratio sensor 39, and feedback controls the air-fuel ratio in accordance with the engine operating state of the engine 1. The step S9 constitutes a second air-fuel ratio control section.

After the air-fuel ratio control of the engine 1 has been started with the aid of the second air-fuel ratio sensor 39, the heater of the first air-fuel ratio sensor 36 is switched off in step S11, and the process is ended.

Figure 4:
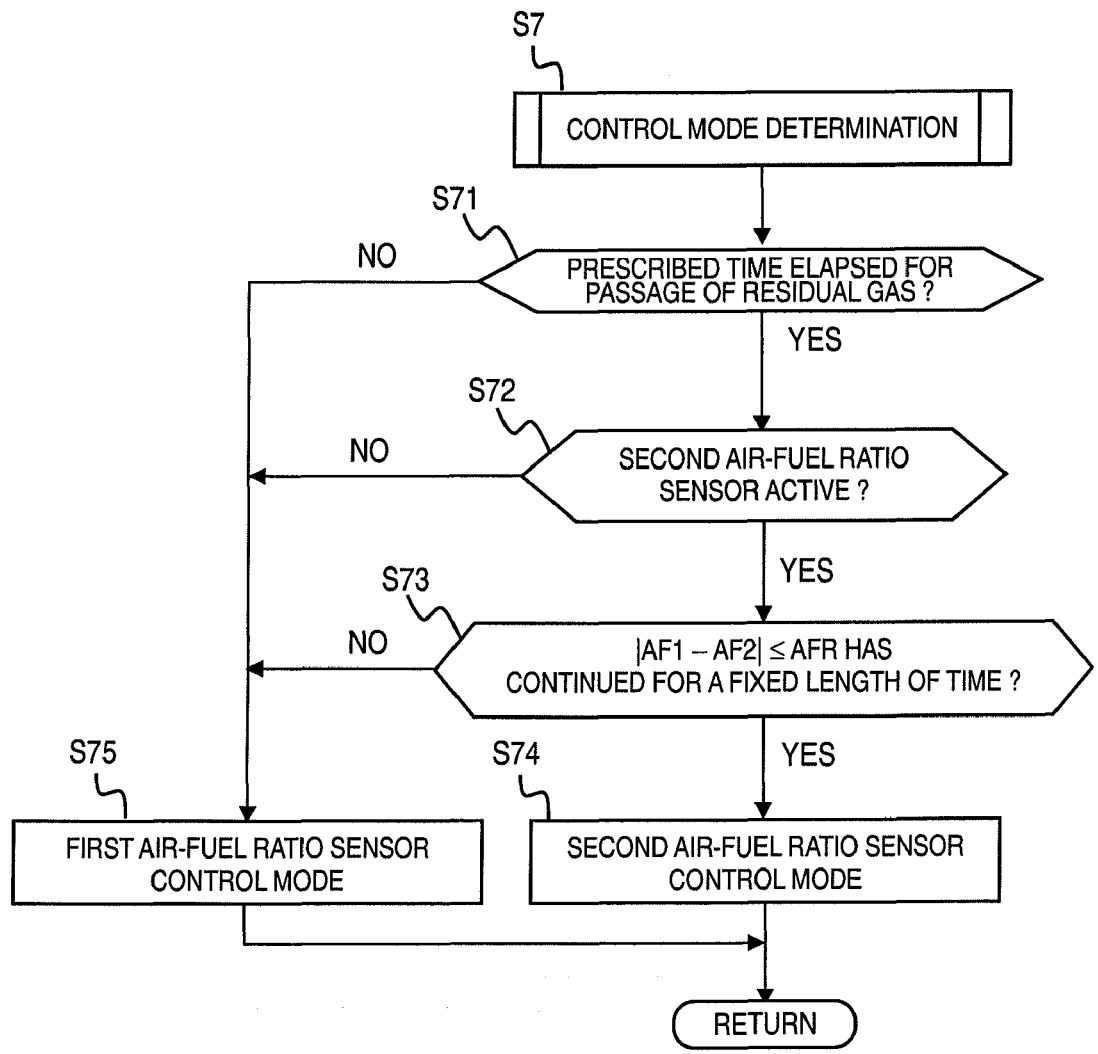
FIG. 4 is a flowchart showing the processing steps executed by the air-fuel ratio control apparatus when conducting control mode determination in accordance with the first embodiment.

Next, the control mode determination of step S7 will be described with reference to FIG. 4 in accordance with the first embodiment. FIG. 4 is a flowchart showing the control routine of the control mode determination in step S7. The step S7 constitutes a control mode switching section.

In step S71, the controller 40 determines whether the low-temperature residual gas has passed by the air-fuel ratio sensor 39 disposed in the main exhaust channel 32 after the switching valve 37 has been opened. This determination is made based on whether the residual gas passage time (e.g., 0.3 to 0.5 sec), which is a prescribed reference value, has elapsed after the switching valve 37 opens. The residual gas passage time as the reference value is determined by calculating the exhaust velocity of the exhaust in the main exhaust channel 32 based on the current engine speed or current engine load. Thus, the prescribed reference value (prescribed time) changes with changes in either the current engine speed or current engine load.

Here, the process advances to step S72 when the residual gas passage time has elapsed. The process advances to step S75 when the residual gas passage time has not elapsed, and the control mode is set to the first air-fuel ratio sensor control mode.

In step S72, the controller 40 determines whether the second air-fuel ratio sensor 39 is active. The step S72 constitutes an activity determination section. The activity of the second air-fuel ratio sensor 39 is determined based on the temperature of the sensor element. The process advances to step S73 when the second air-fuel ratio sensor 39 is active. The process advances to step S75 when the second air-fuel ratio sensor 39 is inactive, and the control mode is set in the first air-fuel ratio sensor control mode.

In step S73, the controller 40 compares the detection value (AF1) of the first air-fuel ratio sensor 36 and the detection value (AF2) of the second air-fuel ratio sensor 39. The step S73 constitutes a continuous time determination section. Since the bypass channel 31 and the main exhaust channel 32 have different sectional areas, the exhaust flow rate of the exhaust that flows through the bypass channel 31 and the main exhaust channel 32 is also different. For this reason, the difference between AF1 and AF2 may be considerable when the air-fuel ratio fluctuations of the engine 1 are considerable during acceleration or at other times, and the air-fuel ratio rapidly changes and emissions deteriorate when a switch is made from the first air-fuel ratio sensor 36 to the second air-fuel ratio sensor 39 to control the air-fuel ratio of the engine 1. Therefore, a determination is made in step S73 whether the absolute value of the difference between AF1 and AF2 is a prescribed value (AFR) or less, as shown in formula (1). This value has been set to a level that does not allow emissions to deteriorate.

$$|AF1-AF2| \leq AFR \quad (1)$$

Where: AF1: Detection value of the first air-fuel ratio sensor 36;

AF2: Detection value of the second air-fuel ratio sensor 39; and

AFR: Prescribed value.

When a state that satisfies formula (1) continues for a fixed length of time, the controller 40 determines that the air-fuel ratio fluctuations of the engine 1 are stable and emissions will not deteriorate even if a switch is made from the first air-fuel ratio sensor 36 to the second air-fuel ratio sensor 39. The process advances to step S74 and the control mode is set to the second air-fuel ratio sensor control mode. When a state that satisfies formula (1) does not continue for a fixed length of time, it is determined that emissions will deteriorate if the air-fuel ratio sensor is switched. The process advances to step S75 and the control mode is set to the first air-fuel ratio sensor control mode.

The prescribed value (AFR) described above can be set in accordance with the operating state of the vehicle. For example, when the switching valve 37 is opened during idling of the vehicle, during normal travel, or at other times in which vehicle speed fluctuations are small and air-fuel ratio fluctuations are low, a first prescribed value (AFR1) (e.g., 0.3 sec) can be set, and a second prescribed value (AFR2) (e.g., 0.5 sec) that is greater than the first prescribed value can be selected when the valve is opened during vehicle acceleration or deceleration, or at other times in which vehicle speed fluctuations are great and air-fuel ratio fluctuations are high.

The process advances to step S8 shown in FIG. 3 after the control mode determination has been executed in steps S71 to S75 as discussed above.

In accordance with the above, the air-fuel ratio control apparatus 100 of the first embodiment can obtain the following effects.

The low-temperature residual gas remaining in the main exhaust channel 32 in the vicinity of the switching valve 37 flows toward the second air-fuel ratio sensor 39 when the switching valve 37 is open. Since the residual gas is at a lower temperature than the exhaust immediately after being discharged from the engine 1, the sensor temperature of the second air-fuel ratio sensor 39 is reduced when the residual gas passes by and the detection accuracy of the second air-fuel ratio sensor 39 is reduced. In a state in which the detection accuracy of the second air-fuel ratio sensor has deteriorated in this manner, emissions will deteriorate when the air-fuel ratio of the engine 1 is controlled.

In the first embodiment, the control mode is determined in order to switch from the first air-fuel ratio sensor 36 to the second air-fuel ratio sensor 39 when the switching valve 37 is opened. In step S72 of control mode determination, a determination is made whether the second air-fuel ratio sensor 39 is active after the residual gas has passed, and when the second air-fuel ratio sensor 39 is active, a switch is made from the first air-fuel ratio sensor 36 to the second air-fuel ratio sensor 39. For this reason, the air-fuel ratio of the engine 1 can be accurately controlled based on the detection value of the second air-fuel ratio sensor 39, which is in an active state, and emissions can be prevented from deteriorating.

When a switch is made from the first air-fuel ratio sensor 36 to the second air-fuel ratio sensor 39 before the residual gas has passed by the second air-fuel ratio sensor 39, the second air-fuel ratio sensor 39 detects the oxygen concentration of the residual gas, which does not correspond to the operating state of the engine 1. When the air-fuel ratio of the engine 1 is controlled based on the oxygen concentration of the residual gas, the air-fuel ratio cannot be accurately controlled and emissions will deteriorate. In step S71 of determining the control mode according to the first embodiment, the second air-fuel ratio sensor 39 will not detect the oxygen concentration of the residual gas because a switch is made from the first air-fuel ratio sensor 36 to the second air-fuel ratio sensor 39 after the residual gas has passed by the second air-fuel ratio sensor 39. The air-fuel ratio of the engine 1 can therefore be accurately controlled based on the detection value of the second air-fuel ratio sensor 39, and emissions can be prevented from deteriorating.

The difference between the detection values of the first air-fuel ratio sensor 36 and the second air-fuel ratio sensor can be considerably different when the air-fuel ratio fluctuations of the engine 1 are high or at other times even after the residual gas has passed by the second air-fuel ratio sensor 39 and the second air-fuel ratio sensor 39 is active. The air-fuel ratio of the engine 1 rapidly changes when a switch is made from the first air-fuel ratio sensor 36 to the second air-fuel ratio sensor 39 in such a state, and not only will emissions deteriorate but also a torque shock will occur. In step S73 of determining the control mode according to the first embodiment, when the absolute value of the difference between the detection values of the first and second air-fuel ratio sensors 36 and 39 is a prescribed value or less and such a state continues for a fixed length of time, a switch is made from the first air-fuel ratio sensor 36 to the second air-fuel ratio sensor 39. For this reason, emissions can be prevented from deteriorating due to the switching of the air-fuel ratio sensor to the second air-fuel ratio sensor 39, and torque shock due to the rapid change in the air-fuel ratio can be reduced.

Second Embodiment

A second embodiment of the air-fuel ratio control apparatus 100 will be described with reference to FIG. 5. The basic configuration of the second embodiment is the same as that of the first embodiment, but the configuration of the control mode determination of the controller 40 is different. Specifically, the configuration is provided with a failsafe function in which the air-fuel ratio sensor is forcibly switched when the vehicle is in a prescribed operating state. Thus, the following description will mainly focus on this point of difference from the first embodiment.

Figure 5:
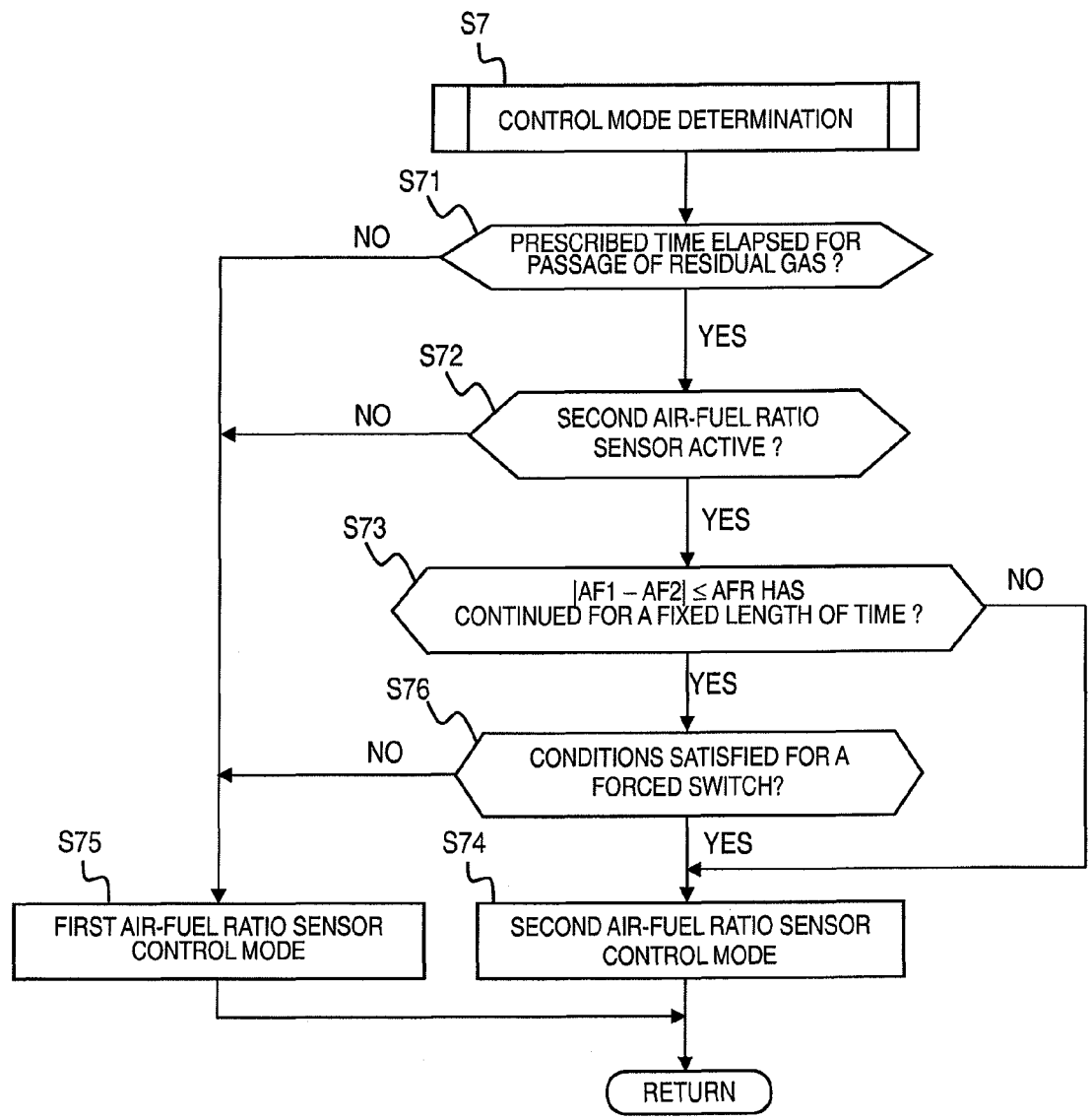
FIG. 5 is a flowchart showing the processing steps executed by the air-fuel ratio control apparatus when conducting control mode determination in accordance with a second embodiment.

FIG. 5 is a flowchart showing the control routine of the control mode determination in the second embodiment. The control processes of steps S71 to S75 are the same as in the first embodiment, and thus, descriptions of these steps will not be repeated for the sake of brevity.

In step S73, the detection value of the first air-fuel ratio sensor 36 and the detection value of the second air-fuel ratio sensor 39 are compared in the same manner as in the first embodiment, and a determination is made as to whether a state that satisfies formula (1) has continued for the prescribed length of time. When a state that satisfies formula (1) has continued for the prescribed length of time, the process advances to step S75 and the control mode is set in the second air-fuel ratio sensor mode. However, the process advances to step S76 when a state that satisfies formula (1) has not continued for a fixed length of time.

In step S76, the controller 40 determines whether forced switching conditions have been satisfied. The step S76 constitutes a condition determination section.

In the first embodiment, the air-fuel ratio of the engine 1 is controlled based on the detection value of the first air-fuel ratio sensor 36 when a state that satisfies formula (1) has not continued for a prescribed length of time. However, since most of the exhaust from the engine 1 flows through the main exhaust channel 32 when the switching valve 37 is open and the amount of exhaust that flows through the bypass channel 31 is low, there are cases in which the fluctuations of the air-fuel ratio cannot be detected with good precision by the first air-fuel ratio sensor 36 disposed in the bypass channel 31 in which the exhaust flow rate is low in an operating state in which the fluctuations of the air-fuel ratio are considerable.

In view of the above, in the second embodiment, a failsafe function is provided that forces a switch from the first air-fuel ratio sensor 36 to the second air-fuel ratio sensor 39 in step S76 when a state that satisfies formula (1) has not continued for a fixed length of time after a prescribed length of time has elapsed.

The state that does not satisfies formula (1), i.e., when the difference is considerable between the detection values of the first and second air-fuel ratio sensors 36, the air-fuel ratio changes rapidly when a switch is made from the first air-fuel ratio sensor 36 to the second air-fuel ratio sensor 39, and the riding comfort is compromised because torque shock is generated by the change in the air-fuel ratio. For this reason, in the second embodiment, operating conditions are selected such as during acceleration and deceleration when fluctuations in the vehicle speed area considerable, during disengagement of the lockup clutch, during operation of the vehicle in a high load range, or other at other times when the driver is less likely to feel torque shock, and the air-fuel ratio sensor is forcibly switched after a prescribed length of time has elapsed even if formula (1) is not satisfied.

In this manner, the process advances to step S74 when the controller 40 determines that the forced switching conditions have been satisfied in step S76. The process advances to step S75 when the forced switching conditions have not been satisfied.

The controller 40 sets the control mode to the second air-fuel ratio sensor control mode in step S74. The controller 40 sets the control mode to the first air-fuel ratio sensor control mode in step S75.

In accordance with the above, the air-fuel ratio control apparatus 100 of the second embodiment can obtain the following effects.

In the second embodiment, the same effects as the first embodiment can be obtained because the control mode is determined to switch from the first air-fuel ratio sensor 36 to the second air-fuel ratio sensor 39 when the switching valve 37 has been opened.

In control mode determination, a forced switch is made from the first air-fuel ratio sensor 36 to the second air-fuel ratio sensor 39 in operating conditions in which torque shock is less likely to be detected when conditions that satisfy formula (1) have not continued for a prescribed length of time. Riding comfort can therefore be prevented from being compromised due to a switch in the air-fuel ratio sensor when the difference in the detection values of the first and second air-fuel ratio sensors 36 and 39 is considerable.

In the first embodiment and second embodiment, the air-fuel ratio sensors 36 and 39 can be replaced with oxygen sensors such that the oxygen concentration in the exhaust can be detected by the oxygen sensors rather than by the air-fuel ratio sensors 36 and 39. Thus, the air-fuel ratio of the engine 1 can be controlled based on the detection values of the oxygen sensors.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An air-fuel ratio control apparatus comprising:
an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to close the exhaust channel to switch a pathway for exhaust gas from the exhaust channel to the bypass channel;
a first sensor arranged to detect a property indicative of an air-fuel ratio of exhaust flowing in the bypass channel;
a second sensor arranged to detect a property indicative of an air-fuel ratio of exhaust flowing in the exhaust channel at a point downstream of the valve mechanism; and
a controller including a first air-fuel ratio control section configured to control an engine air-fuel ratio based on an output of the first sensor, a second air-fuel ratio control section configured to control the engine air-fuel ratio based on an output of the second sensor, and a control mode switching section configured to switch from control by the first air-fuel ratio control section to control by the second air-fuel ratio control section after a prescribed interval of time has elapsed from when the valve mechanism is switched from a closed state to an open state,
the controller being further configured such that the prescribed interval of time is established based a time required for a temperature of the second sensor reach a prescribed temperature after the second sensor being cooled due to the valve mechanism being switched to the open state.

2. An air-fuel ratio control apparatus comprising:
an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to close the exhaust channel to switch a pathway for exhaust gas from the exhaust channel to the bypass channel;
a first sensor arranged to detect a property indicative of an air-fuel ratio of exhaust flowing in the bypass channel;
a second sensor arranged to detect a property indicative of an air-fuel ratio of exhaust flowing in the exhaust channel at a point downstream of the valve mechanism; and
a controller including a first air-fuel ratio control section configured to control an engine air-fuel ratio based on an output of the first sensor, a second air-fuel ratio control section configured to control the engine air-fuel ratio based on an output of the second sensor, and a control mode switching section configured to switch from control by the first air-fuel ratio control section to control by the second air-fuel ratio control section after a prescribed interval of time has elapsed from when the valve mechanism is switched from a closed state to an open state,
the controller including an activity determination section configured to determine an activity state of the second sensor after the valve mechanism switches from the closed state to the open state and after the prescribed interval of time has elapsed, and
the controller being further configured such that, when the valve mechanism is switched from the closed state to the open state, control switches from the first air-fuel ratio control section to the second air-fuel ratio control section after the prescribed interval of time has elapsed from the valve mechanism switching from the closed state to the open state and the second sensor has been determined by the activity determination section to be active.

3. The air-fuel ratio control apparatus as recited in claim 2, further comprising
a continuous time determination section configured to determine whether an absolute value of a difference between detection values by the first and second sensors is a prescribed value or less for a fixed continuous length of time after the second sensor has been determined by the activity determination section to be active,
the controller being further configured such that control switches from the first air-fuel ratio control section to the second air-fuel ratio control section when the second sensor has been determined to be active, and an absolute value of the difference between the detection values of the first and second sensors has been determined to be the prescribed value or less for a fixed continuous length of time.

4. The air-fuel ratio control apparatus as recited in claim 3, wherein
the continuous time determination section sets a first prescribed value, as the prescribed value when vehicle speed fluctuations are small, and sets a second prescribed value that is greater than the first prescribed value when the vehicle speed fluctuation rate is larger than a predetermined vehicle speed fluctuation rate.

5. The air-fuel ratio control apparatus as recited in claim 3, further comprising
a condition determination section is further configured to determine whether a prescribed vehicle operating state exists after a prescribed length of time has elapsed since a determination has been conducted by the continuous time determination section; and
the controller is further configured such control is switched from the first air-fuel ratio control section to the second air-fuel ratio control section when the continuous time determination section determines that the absolute value of the difference between the detection values of the first and second sensors has not been at the prescribed value or less for the fixed continuous length of time and when the prescribed length of time has elapsed after the determination was made by the continuous time determination section and the condition determination section has determined that the vehicle prescribed operating state exists.

6. The air-fuel ratio control apparatus as recited in claim 5, wherein the controller is further configured such the prescribed operating state is determined to exist when vehicle speed fluctuations are larger than a predetermined fluctuation amount.

7. The air-fuel ratio control apparatus as recited in claim 5, wherein
the controller is further configured such the prescribed operating state is determined to exist when a lockup clutch is disengaged.

8. The air-fuel ratio control apparatus as recited in claim 5, wherein
the controller is further configured such the prescribed operating state is determined to exist during an engine high-load operation.

9. An air-fuel ratio control method for an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to close the exhaust channel to switch a pathway for exhaust gas from the exhaust channel to the bypass channel, the method comprising:
    detecting a property indicative of an air-fuel ratio of exhaust flowing in the bypass channel using a first sensor;
    detecting a property indicative of an air-fuel ratio of exhaust flowing in the exhaust channel at a point downstream of the valve mechanism using a second sensor;
    controlling an engine air-fuel ratio based on the air-fuel ratio detected by the first sensor when the valve mechanism is closed;
    controlling the engine air-fuel ratio based on the air-fuel ratio detected by the second sensor after a prescribed interval of time has elapsed when the valve mechanism is switched from a closed state to an open state; and
    establishing the prescribed interval of time based a time required for a temperature of the second sensor reach a prescribed temperature after the second sensor being cooled due to the valve mechanism being switched to the open state.

10. An air-fuel ratio control method for an exhaust system including an exhaust channel with a main catalytic converter disposed in the exhaust channel, a bypass channel with a bypass catalytic converter disposed in the bypass channel, and a valve mechanism disposed between a branching section of the bypass channel and a merging section of the bypass channel on the upstream side of the main catalytic converter to close the exhaust channel to switch a pathway for exhaust gas from the exhaust channel to the bypass channel, the method comprising:
    detecting a property indicative of an air-fuel ratio of exhaust flowing in the bypass channel using a first sensor;
    detecting a property indicative of an air-fuel ratio of exhaust flowing in the exhaust channel at a point downstream of the valve mechanism using a second sensor;
    controlling an engine air-fuel ratio based on the air-fuel ratio detected by the first sensor when the valve mechanism is closed;
    controlling the engine air-fuel ratio based on the air-fuel ratio detected by the second sensor after a prescribed interval of time has elapsed when the valve mechanism is switched from a closed state to an open state;
    determining activity state of the second sensor after the valve mechanism switches from the closed state to the open state and after the prescribed interval of time has elapsed; and
    switching from control based on the first sensor to control based on the second sensor after the prescribed interval of time has elapsed from the valve mechanism switching from the closed state to the open state and after the second sensor has been determined to be active.

11. The air-fuel ratio control method as recited in claim 10, further comprising
    determining whether an absolute value of a difference between detection values by the first and second sensors is a prescribed value or less for a fixed continuous length of time after the second sensor has been determined by the activity determination section to be active, and
    the switching of the control based on the first sensor to control based on the second sensor when the second sensor has been determined to be active, and an absolute value of the difference between the detection values of the first and second sensors has been determined to be the prescribed value or less for a fixed continuous length of time.

12. The air-fuel ratio control method as recited in claim 11, further comprising
    setting a first prescribed value, as the prescribed value when vehicle speed fluctuations are small, and setting a second prescribed value that is greater than the first prescribed value when the vehicle speed fluctuation rate is larger than a predetermined vehicle speed fluctuation rate.

13. The air-fuel ratio control method as recited in claim 11, further comprising
    determining whether a prescribed vehicle operating state exists after a prescribed length of time has elapsed since a determination that the absolute value of the difference between the detection values of the first and second sensors has not been at the prescribed value or less for the fixed continuous length of time; and
    switching from control based on the first sensor to control based on the second sensor upon determining the prescribed vehicle operating state exists after the prescribed length of time has elapsed since the determination that the absolute value of the difference between the detection values of the first and second sensors has not been at the prescribed value or less for the fixed continuous length of time.

14. The air-fuel ratio control method as recited in claim 13, further comprising
    determining the prescribed operating state exists when vehicle speed fluctuations are larger than a predetermined fluctuation amount.

15. The air-fuel ratio control method as recited in claim 13, wherein
    determining the prescribed operating state exists when a lockup clutch is disengaged.

16. The air-fuel ratio control method as recited in claim 13, wherein
    determining the prescribed operating state exists during an engine high-load operation.

* * * * *